United States Patent
Fiebrandt et al.

(10) Patent No.: US 11,433,858 B2
(45) Date of Patent: Sep. 6, 2022

(54) CLEANING DEVICE, COMPRESSED-AIR SYSTEM, VEHICLE AND CLEANING METHOD

(71) Applicant: ZF CV Systems Hannover GmbH, Hannover (DE)

(72) Inventors: Jan Fiebrandt, Hannover (DE); Helge Westerkamp, Hannover (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 0 days.

(21) Appl. No.: 17/285,921

(22) PCT Filed: Sep. 30, 2019

(86) PCT No.: PCT/EP2019/076406
§ 371 (c)(1),
(2) Date: Apr. 16, 2021

(87) PCT Pub. No.: WO2020/078703
PCT Pub. Date: Apr. 23, 2020

(65) Prior Publication Data
US 2021/0323510 A1    Oct. 21, 2021

(30) Foreign Application Priority Data
Oct. 19, 2018   (DE) .................... 10 2018 126 091.1

(51) Int. Cl.
*B60S 1/54*    (2006.01)
*B08B 3/02*    (2006.01)
(Continued)

(52) U.S. Cl.
CPC .............. *B60S 1/54* (2013.01); *B05B 7/0807* (2013.01); *B05B 12/06* (2013.01); *B08B 3/02* (2013.01); *B08B 5/02* (2013.01)

(58) Field of Classification Search
CPC .... B60S 1/54; B60S 1/481; B60S 1/56; B05B 7/0807; B05B 12/06; B05B 1/005; B05B 1/16; B08B 3/02; B08B 5/02
See application file for complete search history.

(56) References Cited

U.S. PATENT DOCUMENTS 3,915,385 A * 10/1975 Hassinger ............... B60S 1/603
                                                         239/284.2
4,390,128 A *  6/1983 Fujikawa ................ B60S 1/603
                                                         239/284.2
(Continued)

FOREIGN PATENT DOCUMENTS

CA        2139402 C     9/1998
DE   102014213282 A1    1/2016
(Continued)

*Primary Examiner* — Alexander Markoff
(74) *Attorney, Agent, or Firm* — Leydig, Voit & Mayer, Ltd.

(57) ABSTRACT

A cleaning device for selectively applying a first medium to a surface includes a high pressure reservoir configured to store the first medium held under a storage pressure, a pulse nozzle configured to apply the first medium under the storage pressure in a pulsed manner to the surface, and a switching valve that includes a nozzle port and a high pressure reservoir port for selectively establishing a first connection between the high pressure reservoir and the pulse nozzle, and a feed port for establishing a second connection between the high pressure reservoir and a first medium source. The high pressure reservoir and the switching valve are structurally integrated in a reservoir valve module. The switching valve comprises a solenoid valve to switch between the first and the second connection when the high pressure reservoir port is under the storage pressure.

18 Claims, 6 Drawing Sheets

(51) Int. Cl.
  *B05B 7/08* (2006.01)
  *B05B 12/06* (2006.01)
  *B08B 5/02* (2006.01)

(56) References Cited

U.S. PATENT DOCUMENTS

| | | | | |
|---|---|---|---|---|
| 5,657,929 A * | 8/1997 | DeWitt | ............... | B60S 1/52 15/250.02 |
| 6,554,210 B2 * | 4/2003 | Holt | ............... | B05B 7/08 239/284.2 |
| 6,805,305 B2 * | 10/2004 | Schlosser | ............... | B60S 1/481 239/284.1 |
| 6,951,223 B2 * | 10/2005 | Fukushima | ............... | B60S 1/481 134/186 |
| 6,994,908 B1 * | 2/2006 | Ishiwari | ............... | B32B 27/30 428/422 |
| 7,040,328 B2 * | 5/2006 | Woodard | ............... | B08B 3/02 134/102.3 |
| 9,180,840 B2 | 11/2015 | Matsukawa et al. | | |
| 9,707,896 B2 | 7/2017 | Boegel et al. | | |
| 10,761,013 B2 * | 9/2020 | Stamer | ............... | G01N 21/15 |
| 10,888,890 B2 * | 1/2021 | Fiebrandt | ............... | B05B 1/3006 |
| 2001/0054655 A1 * | 12/2001 | Berg | ............... | B60S 1/481 239/284.1 |
| 2002/0137455 A1 * | 9/2002 | Ivanov | ............... | B60S 1/52 454/157 |
| 2007/0183039 A1 | 8/2007 | Irvin | | |
| 2010/0084494 A1 * | 4/2010 | Krishnan | ............... | F16K 31/0658 239/585.3 |
| 2013/0092758 A1 * | 4/2013 | Tanaka | ............... | B60S 1/52 239/284.1 |
| 2015/0203077 A1 * | 7/2015 | Gokan | ............... | H04N 5/2171 134/36 |
| 2015/0367358 A1 * | 12/2015 | Funseth | ............... | B05B 1/1645 239/159 |
| 2016/0152213 A1 * | 6/2016 | Baerg | ............... | B60S 1/54 134/56 R |
| 2016/0320292 A1 * | 11/2016 | Stamer | ............... | G01N 21/15 |
| 2016/0339875 A1 * | 11/2016 | Ina | ............... | B60S 1/522 |
| 2017/0313286 A1 * | 11/2017 | Galera | ............... | B60S 1/52 |
| 2018/0086317 A1 * | 3/2018 | Shank | ............... | B60S 1/487 |
| 2018/0290632 A1 | 10/2018 | Kennelly et al. | | |
| 2019/0031155 A1 * | 1/2019 | Mizuno | ............... | F04B 35/01 |
| 2019/0083993 A1 * | 3/2019 | Funseth | ............... | A01M 7/006 |
| 2019/0270433 A1 * | 9/2019 | Hester | ............... | B08B 3/024 |
| 2020/0282416 A1 * | 9/2020 | Fiebrandt | ............... | B05B 1/3006 |
| 2020/0324738 A1 | 10/2020 | Baba et al. | | |
| 2021/0387596 A1 * | 12/2021 | Fiebrandt | ............... | B08B 5/02 |

FOREIGN PATENT DOCUMENTS

| | | |
|---|---|---|
| DE | 102015013203 A1 | 3/2016 |
| DE | 102017010254 A1 | 5/2019 |
| WO | 2017080614 A1 | 5/2017 |
| WO | 2018043743 A1 | 3/2018 |
| WO | 2019012882 A1 | 1/2019 |

* cited by examiner

CLEANING DEVICE, COMPRESSED-AIR SYSTEM, VEHICLE AND CLEANING METHOD

CROSS-REFERENCE TO PRIOR APPLICATIONS

This application is a U.S. national phase application under 35 U.S.C. § 371 of International Application No. PCT/EP2019/076406, filed on Sep. 30, 2019, and claims benefit to German Patent Application No. DE 10 2018 126 091.1, filed on Oct. 19, 2018. The international application was published in German on Apr. 23, 2020, as WO 2020/078703 A1 under PCT Article 21(2).

FIELD

The invention relates to a cleaning device for selectively bombarding a surface with a first medium, having: a high-pressure accumulator configured for storing the first medium which is loaded with an accumulator pressure, in particular a high pressure, an impulse nozzle configured for bombarding the surface in a pulse-like manner with the first medium which is loaded with the accumulator pressure, and a changeover valve.

BACKGROUND

A cleaning device of the type described initially is disclosed in DE10 2015 013203 A1. This describes a cleaning unit for an image detection unit of a vehicle, which is provided for detecting the environment, with at least one washing water nozzle which is provided to spray washing water onto a transparent cover surface of the image detection unit, with at least one wiper which is intended to mechanically dry the cover surface of the image detection unit, and with at least one compressed-air nozzle which is provided to bombard the cover surface of the image detection unit with compressed air.

The concept could however be improved, in particular with respect to the necessity for a mechanical wiper for cleaning.

U.S. Pat. No. 9,707,896 B2 describes a viewing system for a vehicle comprising a camera with an image converter and a lens. The camera is situated on an outer part of a vehicle and has a field of vision outside the vehicle. An airflow element has an inlet opening and an outlet opening, wherein the outlet opening is configured such that it deflects the airflow in front of the lens in order to conduct dirt away from the lens. The outlet opening is configured such that it deflects the airflow with a speed which is greater than an airflow speed flowing into the inlet port. The inlet opening may have an inlet region which is substantially larger than an outlet region of the outlet port. The system may comprise an airflow generating device for generating or amplifying the airflow through the airflow device. This concept thus creates an air curtain for protecting a sensor from external influences, and is thus also worthy of improvement in particular with respect to cleaning of the sensor.

It is desirable to guarantee reliable and/or thorough cleaning, in particular with relatively low complexity, in particular with respect to apparatus. Furthermore, a low consumption of energy and cleaning media is desirable, together with a robust construction in particular requiring as little maintenance as possible. A compact construction is particularly desirable.

SUMMARY

In an embodiment, the present invention provides a cleaning device for selectively bombarding a surface with a first medium. The cleaning device includes a high-pressure accumulator configured to store the first medium which is loaded with an accumulator pressure, an impulse nozzle configured to bombard the surface in a pulse-like manner with the first medium which is loaded with the accumulator pressure, and a changeover valve. The high-pressure accumulator and the changeover valve are integrated in an accumulator valve module. The changeover valve is configured as a solenoid valve and includes a nozzle connector and a high-pressure accumulator connector, configured to selectively establish a first connection between the high-pressure accumulator and the impulse nozzle; and a feed connector configured to establish a second connection between the high-pressure accumulator and a first medium source. In a release position, the changeover valve releases, by way of the supply connector and the nozzle connector, the first connection between the high-pressure accumulator and the impulse nozzle. In a charge position, the changeover valve releases, by way of the high-pressure accumulator connector and the supply connector, the second connection between the high-pressure accumulator and the first medium source. The changeover valve is further configured to switch between the release position and the charge position. The supply connector is loaded with the accumulator pressure of the high-pressure accumulator and/or the high-pressure accumulator connector is loaded with the pressure of the first medium source.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
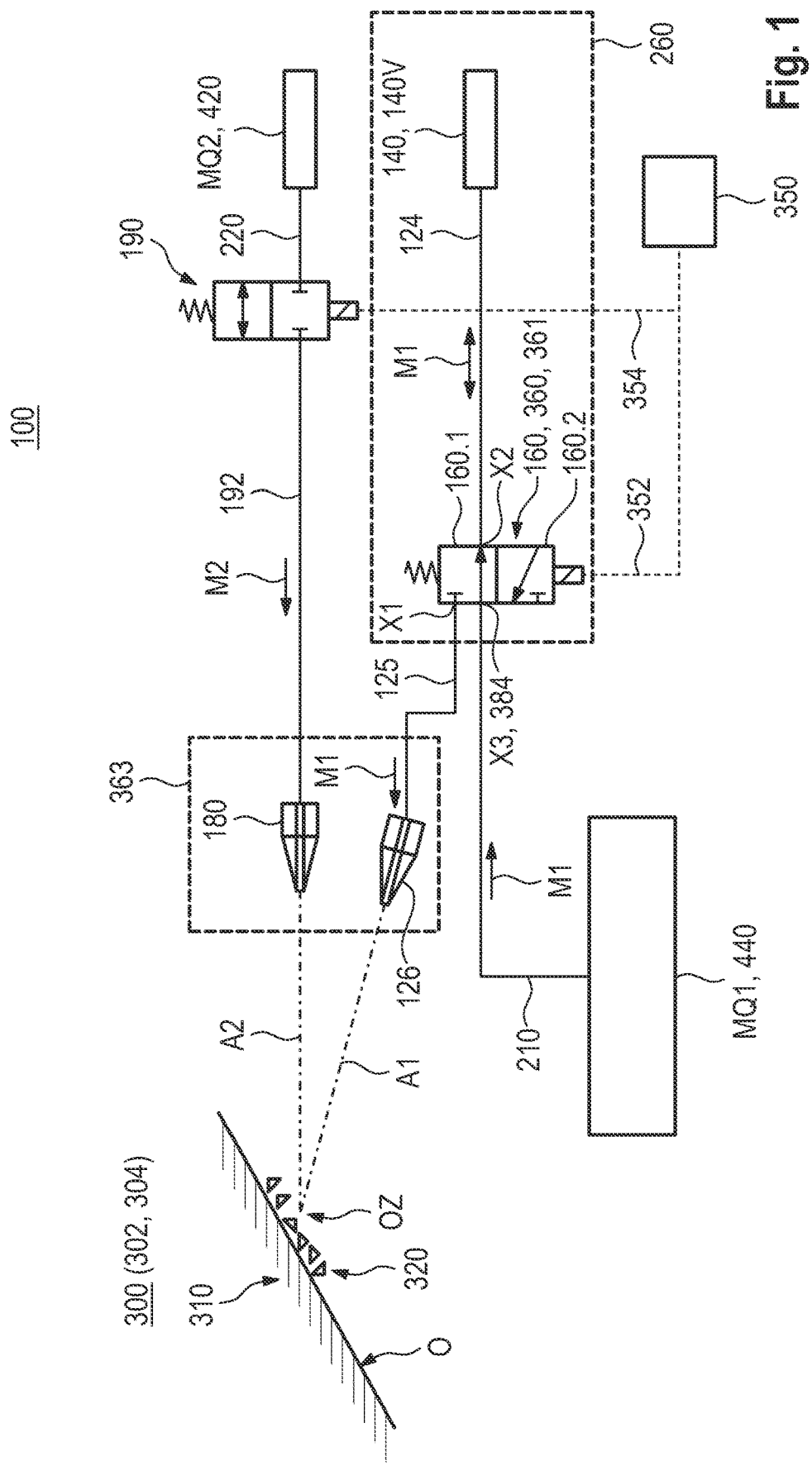
FIG. 1 shows the schematic view of a cleaning device according to an embodiment of the invention.

In an embodiment, the present application provides an improved device and a cleaning method. The present application specifies a cleaning device which at least partially resolves at least one of the issues addressed above.

In particular, a high level of reliability and/or thoroughness of cleaning are to be achieved, preferably despite the equipment outlay and/or the complexity of maintenance of a cleaning device being reduced. In particular, a relatively low consumption of energy and cleaning media is to be achieved. A compact construction is in particular to be achieved, in particular a construction which requires a relatively small installation space and enables assembling with relatively little complexity.

The invention proceeds from a cleaning device of the type mentioned at the outset for selectively bombarding a surface with a first medium, having: a high-pressure accumulator configured for storing the first medium which is loaded with an accumulator pressure, in particular a high pressure, an impulse nozzle configured for bombarding the surface in a pulse-like manner with the first medium which is loaded with the accumulator pressure, and a changeover valve.

The invention considers that it is generally advantageous to keep the complexity of cleaning of surfaces, in particular the complexity of apparatus and the consumption of energy and cleaning media, as low as possible, without however limiting the cleaning effect. This applies in particular to the cleaning of surfaces of a sensor or sensor cover, for which a clean surface is a requirement for proper and reliable function of the sensor.

A cleaning effect of this type can advantageously be achieved by bombarding such a surface in a pulse-like manner with a first medium. The term "pulse-like" in the context of the invention means a sudden, brief bombardment of a surface with a medium, the impulse of which is suitable in particular for detaching and/or removing particles, in particular dirt particles, present on the surface. In general, the cleaning effect of the impulse is advantageously increased for example by a relatively high mass of the medium and/or a relatively high impact speed of the medium on the surface and/or a relatively rapid triggering of the bombardment. A relatively rapid triggering of the bombardment—in particular in contrast to a slow and continuously increasing medium flow—leads to in particular a limited air mass, which is stored in an accumulator, hitting the surface within a relatively short period. Thus advantageously, a high impulse is achieved.

According to the invention, it is provided in the cleaning device that the high-pressure accumulator and the changeover valve in terms of construction are integrated in an accumulator valve module, wherein the changeover valve is configured as a solenoid valve and comprises: a nozzle connector and a high-pressure accumulator connector, configured for selectively establishing a first connection between the high-pressure accumulator and the impulse nozzle; and a feed connector for establishing a second connection between the high-pressure accumulator and a first medium source.

The invention has thus recognized that in terms of construction integrating the high-pressure accumulator and the changeover valve in an accumulator valve module is advantageous. On the one hand, such an integration leads to a relatively minor installation space of the cleaning device and thus to a compact construction mode which is particularly advantageous when used in vehicles where savings in terms of installation space and weight are important. On the other hand, the disposal of the high-pressure accumulator in relative proximity to the changeover valve leads to a relatively short response time since the first medium held in the high-pressure accumulator has to cover a relatively small distance before said first medium by way of the impulse nozzle is directed onto the surface. A disposal of the high-pressure accumulator in relative proximity to the changeover valve advantageously also leads to a relatively minor consumption of the first medium, in particular the compressed air, because there is a relatively small dead volume situated between the high-pressure accumulator and the changeover valve, and in particular between the high-pressure accumulator and the impulse nozzle, said dead volume otherwise having to be overcome by the medium from the high-pressure accumulator after the changeover valve has been switched to a release position.

According to the invention, it is furthermore provided that the changeover valve in a release position by way of the supply connector and the nozzle connector releases the first connection between the high-pressure accumulator and the impulse nozzle; and the changeover valve in a charge position by way of the high-pressure accumulator connector, in particular the feed connector, and the supply connector releases the second connection between the high-pressure accumulator and the first medium source.

Proceeding from this configuration of the changeover valve as a solenoid valve according to the invention, for a pulse-like bombardment of a surface by this medium in the context of a cleaning device described here, the invention has recognized that it is advantageous to switch between the first and the second connection, with the high-pressure accumulator connector loaded with the accumulator pressure.

According to the invention it is thus furthermore provided that the changeover valve is furthermore configured for switching between the release position for releasing the first connection and the charge position for releasing the second connection; wherein the supply connector is loaded with the accumulator pressure of the high-pressure accumulator and/or the high-pressure accumulator connector is loaded with the pressure of the first medium source.

A short response time is advantageously achieved by using a directly switching valve. As opposed thereto, this is not often the case in indirectly switching valves such as, for example, pilot valves. On account of a directly switching valve it is also advantageously possible for the duration of the bombardment, in particular the duration of a compressed air pulse, to be controlled more precisely in temporal terms, since the flow of the medium is directly controlled. As opposed thereto, in indirectly switching valves such as, for example in a pilot valve, it is possible to only indirectly control the flow of the medium.

On account of the changeover valve being configured as a solenoid valve, direct switching of the first medium, which is in particular loaded with a high pressure, is advantageously enabled. As opposed in particular to a pilot valve, the response time between the switching and the pulse-like bombardment can advantageously be shortened on account of the direct switching. A magnetic piston of the solenoid valve is directly moved by energizing a magnetic coil unit of the solenoid valve, on account of which the high-pressure accumulator opens relatively rapidly and the first medium can be rapidly, that is to say in a pulse-like manner, directed onto the surface via the impulse nozzle.

The invention provides a compressed-air system, in particular for a vehicle, having: at least one cleaning device according to the concept of the invention, wherein a first medium source of the compressed-air system by way of a first medium supply line is able to be connected to the at least one cleaning device.

The advantages of the cleaning device are advantageously utilized in the compressed-air system according to the invention.

The invention also provides a vehicle having such a compressed-air system.

The first connection is advantageously formed by the changeover valve and at least by one pressure connector of the high-pressure accumulator, the supply connector, the nozzle connector, and a nozzle supply line to the impulse nozzle. Additionally or alternatively, the second connection is advantageously formed by the changeover valve and at least by a first medium supply line between the medium source and the high-pressure accumulator connector, in particular the feed connector, the supply connector, and a pressure connector between the supply connector and the high-pressure accumulator. This type of first and second connection enables a particularly advantageous integration of the changeover valve.

Configured in the context of a refinement is a nozzle for bombarding the surface with a second medium, wherein the cleaning device is configured for bombarding the surface with a media sequence of at least a first, in particular gaseous, medium and a second, in particular liquid medium. This can specifically include in particular that the bombardment of a surface to be cleaned takes place with a media sequence, in particular a sequence of at least two media that are controlled in an intermittent and/or alternating manner in particular in the manner of one or a plurality of pulses, and are in each case directed onto the surface as a jet, this advantageously leading to a relatively high cleaning effect. The refinement is based on the concept that a sequence of bombardment with a cleaning agent, followed by bombardment with one or a plurality of compressed-air pulses, herein leads to an improved cleaning effect, in particular in comparison with cleaning methods which are based exclusively on compressed air or exclusively on liquid. In comparison to continuously bombarding systems, in particular continually bombarding systems such as, for example air curtains, the advantage that energy and cleaning media can be saved also arises. The refinement is furthermore based on the concept that, when bombarded with a media sequence of this type, the cleaning effect may be at least sufficient, or even better compared in particular with other cleaning methods based exclusively on compressed air or exclusively on liquid, so that in particular the dependency on a mechanical cleaning device, such as e.g. a wiper or similar device in contact with the surface to be cleaned, can be reduced, or such a mechanical cleaning device may even be completely omitted. Thus advantageously, the number of moving parts subject to wear is reduced and hence the robustness increased, and the production costs and susceptibility to fault of the cleaning device are reduced. In the context of the invention, a media sequence is a sequence of one or more bombardments in the context of a cleaning process. Particularly preferably, a media sequence comprises one or more in particular pulse-like bombardments with a first medium, in particular compressed air, and one or more bombardments with a second medium, in particular water.

In the context of a refinement, the changeover valve is configured as a 3/2-way valve, in particular having a supply connector as the feed connector. This specifically includes in particular that the cleaning device can be connected to the first medium source by way of the supply connector. An even more compact construction mode is achieved by this integration of the supply connector in the changeover valve.

In the context of an alternative refinement, the changeover valve is configured as a 2/2-way valve. A 2/2-way valve overall requires less installation space than a 3/2-way valve. In this refinement it is in particular but not exclusively provided that the high-pressure accumulator is connected to the first medium source by way of a high-pressure accumulator holding valve that blocks in the direction of the first medium source. A return flow of the first medium, which is loaded by high pressure, from the high-pressure accumulator to the first medium source can be avoided on account thereof, in particular in the refinement with a 2/2-way valve.

The invention is refined in that the changeover valve loaded with the high pressure, in particular the high-pressure accumulator connector loaded with the high pressure, is configured to switch from a charge position to a release position. The high pressure, in particular the high pressure of the high-pressure accumulator connector, can have a value which is significantly above the ambient pressure. For example, the high pressure may have a value of 2 to 6 bar, preferably 3 to 6 bar. In the context of the present application, high pressure is to be understood as an operating pressure which is significantly above the ambient pressure, in particular in a range from 2 to 6 bar, preferably 3 to 6 bar, and is therefore referred to as high pressure. In the technical context, the operating pressure presently referred to as "high pressure" is however substantially in the technical low-pressure range from 1 to 5 bar, or reaches the technical medium-pressure range from 5 to 99 bar.

The invention is refined in that the accumulator valve module and/or the changeover valve furthermore have/has a supply line check valve, configured for blocking a flow in the direction from the changeover valve to a first medium supply line. A return flow of the first medium, which is loaded with the high pressure, from the high-pressure accumulator to the first medium source can be prevented on account thereof, in particular in a refinement with a 3/2-way valve.

In the context of a refinement, the high-pressure accumulator has a holding capacity between 2 and 10 ml. Such a holding capacity represents a suitable compromise between a relatively small installation space and a sufficient cleaning performance.

In a refinement of the compressed-air system, the compressed-air system has a second medium source which by way of a second medium supply line is able to be connected to the at least one cleaning device. Media sequences of a first medium and a second medium can in particular be generated in a refinement of this type.

In a refinement of the compressed-air system or the vehicle, respectively, it is provided that they first medium source serves another primary purpose, in particular for supplying an air suspension system or like pneumatic system. In a refinement of this type, an already existing medium source, in particular compressed-air source, can advantageously be utilized for supplying the cleaning device. This is particularly advantageous when used in a vehicle or like mobile system, since the number of required components is reduced and weight, costs and energy can thus be saved.

In a refinement of the compressed-air system or the vehicle, respectively, it is provided that the second medium source serves another primary purpose, in particular for supplying a screen washing system or like cleaning system. In a refinement of this type, an already existing medium source, in particular a liquid and/or cleaning-agent source, can advantageously be used for supplying the cleaning device. This is particularly advantageous when used in a vehicle or like mobile system, because the number of required components is reduced and weight, costs and energy can thus be saved.

In a refinement of the compressed-air system or the vehicle, respectively, it is provided that the first medium source has a compressor assembly and/or a compressed-air accumulator, in particular the compressor assembly is disposed in the compressed-air accumulator. A compact construction mode of the compressed-air system is in particular advantageously achieved when the compressor assembly is disposed in the compressed-air accumulator.

In a refinement of the compressed-air system it is provided that the compressed-air system has at least one supply line check valve, in particular in the first medium supply line and/or a first source line. In such a refinement it is in particular advantageously achieved that the compressed air generated by a compressor assembly, in the event of leakages or like tightness issues which lead to pressure losses that in terms of the conveying direction are situated ahead of the valve, cannot escape by way of these leakages. This is in particular the case because of at least one supply line check valve blocking in this flow direction, counter to the conveying direction, and the supply pressure thus being able to be held in particular in that part of the compressed-air system that in terms of the conveying direction is situated behind the valve.

The invention also provides a cleaning method for cleaning a surface, having a cleaning device according to the invention for selectively bombarding a surface with a media sequence of at least a first, in particular gaseous medium, and a second, in particular liquid, medium, wherein the method comprises the following steps:

charging a high-pressure accumulator with a first medium, in particular air;

holding an accumulator pressure in the high-pressure accumulator, in particular by switching the changeover valve to a charge position;

bombarding the surface with a second medium, in particular water or a cleaning agent; and/or bombarding the surface with the first medium, in particular by switching the changeover valve to a release position.

It is advantageously provided that the bombardment of the surface with the second medium and the bombardment of the surface with the first medium takes place under temporal control, in particular in an alternating and/or intermittent manner.

Embodiments of the invention will now be described hereunder with reference to the drawing. This does not necessarily depict the embodiments to scale, but rather the drawing, where useful for comprehension, is produced in schematic and/or slightly distorted form. With respect to supplements to the teaching directly evident from the drawing, reference is made to the relevant prior art. It must be taken into account here that many modifications and changes can be made concerning the form and detail of an embodiment without deviating from the general concept of the invention. The features of the invention disclosed in the description, the drawing and the claims may be essential to the development of the invention, both individually and in any combination. Also, the scope of the invention includes all combinations of at least two of the features disclosed in the description, the drawing and/or the claims. The general concept of the invention is not restricted to the precise form or detail of the preferred embodiments shown and described below, or restricted to a subject which would be limited in comparison with the subjects claimed in the claims. Where dimensional ranges are given, values lying inside said limits are also disclosed as limit values, and may be used and claimed arbitrarily. For the sake of simplicity, the same reference signs are used below for identical or similar parts, or parts with identical or similar function.

FIG. 1 shows the schematic view of an embodiment of a cleaning device 100 according to the concept of the invention. A nozzle assembly 363 has an impulse nozzle 126 and a nozzle 180. The impulse nozzle 126 is configured for directing a first medium M1 along a first jet axis A1 onto a surface O of a sensor 300 which here is illustrated only in fragments. The nozzle 180 is configured for directing a second medium M2 along a second jet axis A2 onto the surface O. The impulse nozzle 126 and the nozzle 180 are configured in the nozzle assembly 363 relative to one another such that the first jet axis A1 and the second jet axis A2 intersect in a target region OZ of the surface O. This alignment serves for removing dirt particles 320 or like contaminations which are in particular situated in the target region OZ. The sensor 300 can in particular be an optical sensor, here symbolically identified as optical sensor 302, and in particular an environment detection sensor, here likewise identified as environment detection sensor 304. The surface O to be cleaned can also be a cover of a sensor, in FIG. 1 symbolically identified as the cover 310 of a sensor, in particular of an afore-mentioned sensor.

The nozzle 180 is connected to a supply line 192. The supply line 192 by way of a second changeover valve 190 is furthermore separably connected to a second medium line 220 for the purpose of supplying the second medium M2 from a second medium source MQ2, presently in the form of a tank 420. It is also conceivable that the first jet axis A1 and the second jet axis A2 do not intersect, but merely hit the surface O at different positions in each case, for example in order to take account of different inertial properties of the first medium M1 and the second medium M2, in particular if the region between the cleaning device 100 and the surface 300 is exposed to acceleration, travel wind and/or similar environmental influences.

In the present case, the changeover valve 160, configured as a solenoid valve 360, is in a first charge position 160.1. The changeover valve 160 is a solenoid valve 360 which is configured as a 3/2-way valve 361 and which has a nozzle connector X1, a high-pressure accumulator connector X2, and a supply connector X3. The high-pressure accumulator connector X2 herein by way of a pressure connector 124 is fluidically connected to a high-pressure accumulator 140. The changeover valve 160 and the high-pressure accumulator 140 in terms of construction here conjointly form a unit in the form of a valve accumulator module 260. The high-pressure accumulator 140 has a holding capacity 140V between 2 and 10 ml. The supply connector X3 establishes a connection to a first medium source MQ1 and thus assumes the function of a feed connector 384 of the cleaning device 100.

In the charge position 160.1 there is a fluidic connection between the supply connector X3 and the high-pressure accumulator connector X2.

In this charge position 160.1 the changeover valve 160, as is illustrated by the arrow, permits in particular a flow of the first medium M1 only in the direction from the supply connector X3 to the high-pressure accumulator connector X2, and blocks a flow in the opposite direction. This can be implemented by way of a supply line check valve 164 (not illustrated here) or a like valve element which is integrated in the changeover valve 160, for example. The nozzle connector X1 is closed in the charge position 160.1. For example, when an accumulator pressure PS prevails in the compressed-air accumulator 440, this accumulator pressure PS in the charge position 160.1 is also built up in the high-pressure accumulator 140 on account of the first medium M1 flowing into said high-pressure accumulator 140. On account of the unilateral blocking effect of the changeover valve 160 in the charge position 160.1 as described above, the built-up accumulator pressure PS is maintained in the high-pressure accumulator 140 even when this pressure should drop again in the compressed-air accumulator 440. This unilateral blocking effect of the changeover valve 160 in this way enables a type of capacitor effect of the high-pressure accumulator 140.

When the changeover valve 160 is switched from the charge position 160.1 to the release position 160.2, the supply connector X3 is blocked and a connection is established between the high-pressure accumulator connector X2 and the nozzle connector X1.

In the release position 160.2 the first medium M1 held in the high-pressure accumulator 140 loaded with accumulator pressure PS is thus directed to the impulse nozzle 126 via an impulse nozzle supply line 125 connected to the nozzle connector X1. The impulse nozzle 126 directs the first medium M1 onto the surface O, which in particular leads to the pulse-like bombardment of the surface.

It is particularly preferred that the first medium M1 is air. Air can be drawn in from the atmosphere, compressed into compressed air in a compressor 402 (not shown here) and stored in the high-pressure accumulator 140. When the surface O is bombarded, in particular in a pulse-like manner, with compressed air by means of the impulse nozzle 126, an advantageous cleaning effect is achieved, in particular together with a one-off or multiple bombardment of the surface O, alternately or at the same time, with the second medium M2 by the nozzle 180 of the nozzle assembly 363. To this end, the bombardment with the second medium M2 can be controlled by way of the second changeover valve 190.

By means of a control module 350 (shown here as an example) which is connected for signal conduction both to the changeover valve 160 by way of a first changeover valve control line 352 and also to the second changeover valve 190 by way of a second changeover valve control line 354, both the first changeover valve 160 and the second changeover valve 190 may be opened or closed, in particular in order to bombard the surface O in a controllable manner and/or to generate media sequences.

In a cleaning method for cleaning a surface O with a cleaning device 100, 100A-D, 100', explained in more detail hereunder, for selectively bombarding a surface O with a media sequence MS of at least a first, in particular gaseous, medium M1 and a second, in particular liquid, medium M2, the method comprises the following steps:

charging a high-pressure accumulator 140, 140' with a first medium M1, in particular air M1.1;

holding an accumulator pressure PS in the high-pressure accumulator 140, 140', in particular by switching the changeover valve 160 to a charge position 160.1;

bombarding the surface O with a second medium M2, in particular water M2.1 or a cleaning agent M2.2; and/or bombarding the surface O with the first medium M1, M1.1, in particular by switching the changeover valve 160 to a release position 160.2.

It is particularly preferred that the second medium M2 is formed by water M2.1 or a cleaning agent M2.2, or a mixture of water M2.1 and cleaning agent M2.2. Also, the second medium M2 can advantageously be taken from a medium source already present in a system, in particular a vehicle. Such a medium source may for example be a tank with cleaning fluid for a screen washing system.

It is particularly provided herein that the bombardment of the surface O with the second medium M2, M2.1, M2.2 and the bombardment of the surface O with the first medium M1, M1.1 take place under temporal control, in particular in an alternating and/or intermittent manner.

An alternating bombardment of the surface O with the first medium M1 and the second medium M2, or a simultaneous, but mutually independent and intermittent bombardment of the surface O with the first medium M1 and the second medium M2, can advantageously achieve an improved cleaning effect. The improved cleaning effect occurs in particular since bombardment with an, in particular liquid, second medium M2 leads to a softening of dirt particles 320 and like undesirable particles on the surface O, and a subsequent, in particular pulse-like bombardment with an, in particular gaseous, first medium M1 leads to a reliable removal of the softened dirt particles 320.

Figure 2A:
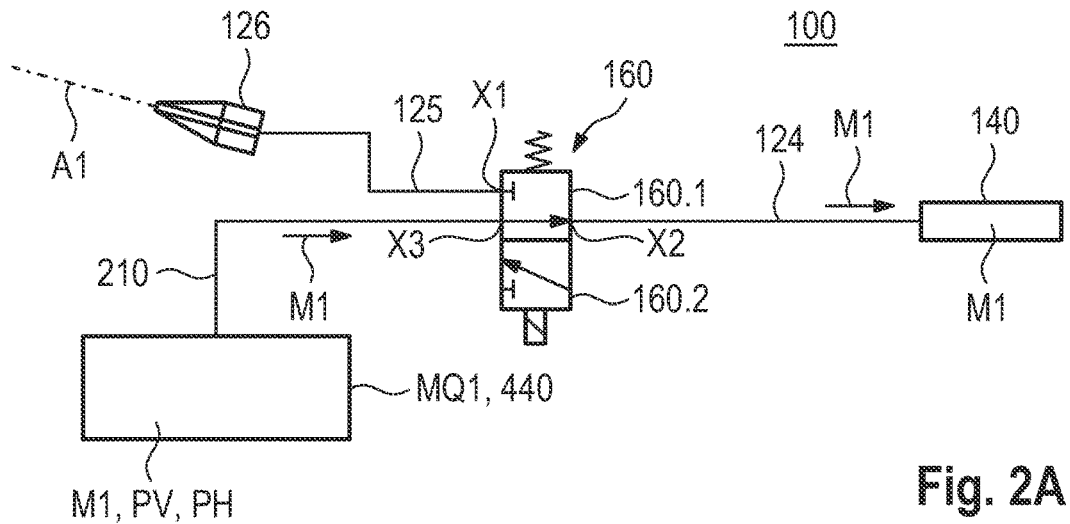
FIGS. 2A-C show a fragmented illustration of the embodiment in three different states.
Figure 2B:
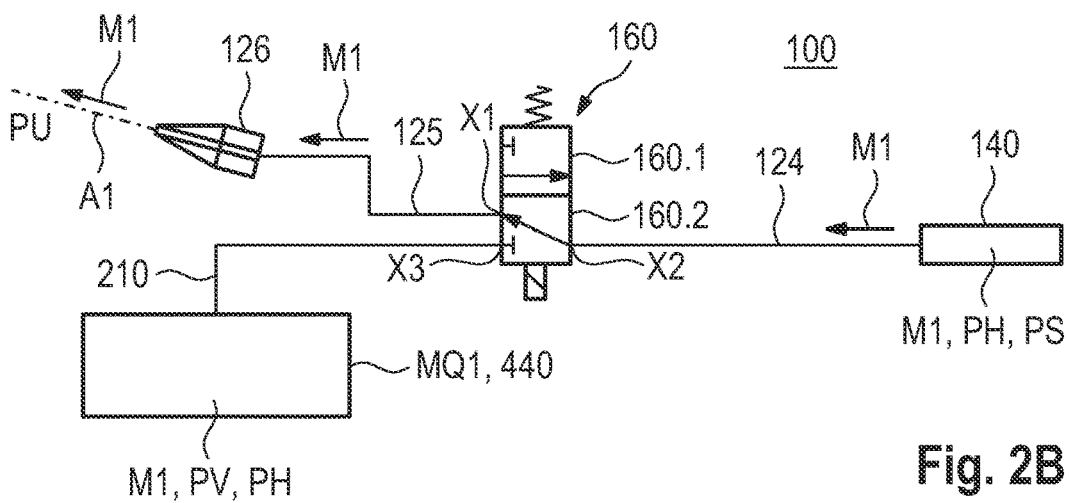
Figure 2C:
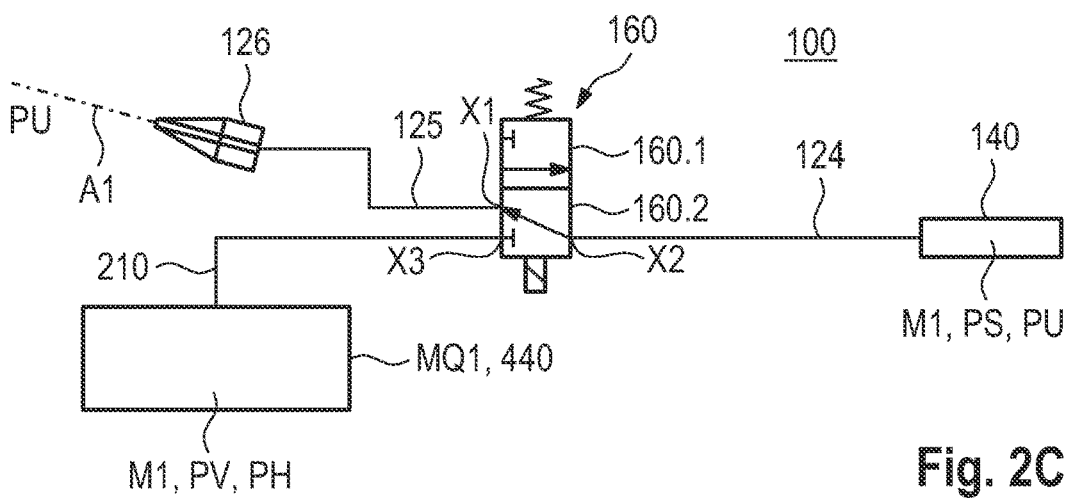

FIG. 2A, FIG. 2B and FIG. 2C show in fragments the refinement of the cleaning device 100 illustrated in FIG. 1, specifically in three different states. The first medium M1 is held so as to be loaded with a supply pressure PV, in particular loaded with a high pressure PH, in the compressed-air accumulator 440. This high pressure PH may be, for example, 3 to 6 bar, wherein high pressure in the context of the present application is to be understood to be an operating pressure which is significantly above the ambient pressure, in particular is in a range from 2 to 6 bar, preferably 3 to 6 bar, and is therefore referred to as high pressure.

In a preferred addition to or variant of the embodiments shown here, the previously mentioned compressed air may initially also emanate from another compressed-air source of any type which is not shown here and is in a vehicle but always available; for example, a compressed-air generator/compressor and/or a reservoir/primary accumulator can be utilized as a compressed-air source. Compressed air generated and/or retrieved therefrom could then be directed onward into the compressed-air accumulator 440. The pressure from the air suspension accumulator to the accumulator 440 can also be regulated by a valve or be correspondingly regulated to the operating pressure of 3 to 6 bar, the latter having previously been referred to as high pressure PH. This is expedient or optionally necessary, respectively, because the usual suspension operating pressure for example in the compressed-air suspension of a vehicle is far above the operating pressure, previously referred to as the high pressure, according to the embodiment, thus above all is significantly above 3 to 6 bar. The compressed-air accumulator 440 having the high pressure PH prevailing therein is a compressed-air accumulator that is disposed upstream of the cleaning device. The supply pressure PV in the compressed-air supply line to the accumulator 440 should be correspondingly regulated to the high pressure PH by a pressure regulator valve.

The changeover valve 160 in FIG. 2A is situated in the charge position 160.1. Accordingly, the first medium M1 from the first medium source MQ1, configured as the compressed-air accumulator 440, by way of the first medium supply line 210, the high-pressure accumulator connector X3, in particular the feed connector 384, the supply connector X2, and the pressure connector 124 can flow into the high-pressure accumulator 140. This connection is also referred to as the second connection between the high-pressure accumulator 140 and the first medium source MQ1.

A state of the cleaning device 100 at a later point in time at which the filling procedure of the high-pressure accumulator 140 has already been completed and an accumulator pressure PS, which as in the compressed-air accumulator 440 has assumed the value of the high pressure PH, prevails in the high-pressure accumulator 140, is illustrated in FIG. 2B. In the state illustrated in FIG. 2B, the changeover valve 160 has just been switched from the charge position 160.1 to the release position 160.2. By virtue of the high pressure PH prevalent in the high-pressure accumulator 140, the first medium by way of the pressure connector of the high-pressure accumulator 140, the supply connector X2, the nozzle connector X1, and the nozzle supply line 125 flows in a pulse-like manner to the nozzle 126 from where the surface O is bombarded in a pulse-like manner with the first medium M1. This connection is also referred to as a first connection between the high-pressure accumulator 140, 140' and the impulse nozzle 126.

After this procedure of the pulse-like bombardment of the surface O with the first medium M1, the cleaning device 100 is situated in the state illustrated in FIG. 2C. The high-pressure accumulator 140 in this state is practically empty, the accumulator pressure having in particular dropped to a lower value, in particular to the value of an ambient pressure PU prevalent outside the cleaning device 100. The ambient pressure PU can be 1 bar, for example. Filling of the high-pressure accumulator 140 can in particular commence again, specifically in that the changeover valve 160 is switched to the charge position 160.1 again, and the state illustrated in FIG. 2A is thus re-established.

Figure 3:
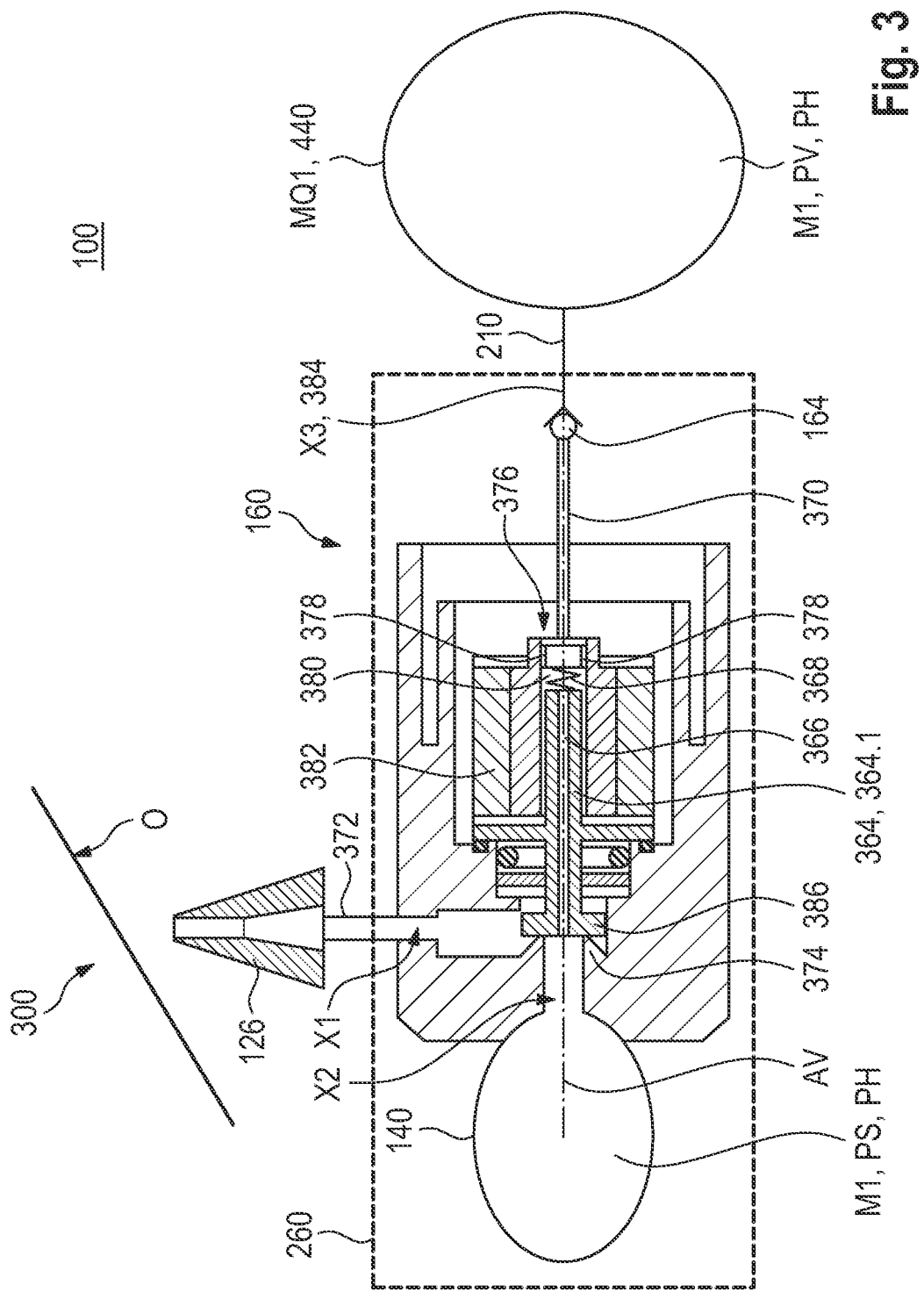
FIG. 3 shows a further fragmented illustration of a cleaning device, with a detailed sectional illustration of a valve accumulator module.

FIG. 3 shows a further fragmented illustration of a cleaning device 100, in which the valve accumulator module 260 is in particular shown in a detailed sectional illustration. A first medium M1 which is loaded with a supply pressure PV, in particular loaded with a high pressure PH, from a first medium source MQ1, which is illustrated in a highly simplified manner and configured as a compressed-air accumulator 440, can be supplied to the valve accumulator module 260 by way of a first medium supply line 210. From the first medium supply line 210, the first medium M1 by way of a feed connector 384, configured as a supply connector X3, and a supply line check valve 164 flows into a valve supply line 370 of the changeover valve 160 configured as a solenoid valve 360. The valve supply line 370 runs from the supply line check valve 164 so as to be coaxial with a valve axis AV up to a port portion 376, where the first medium M1 by way of at least one radially offset port opening 378 is guided into a spring chamber 380. The port portion 376 presently has two port openings 378. The spring chamber 380 receives a piston reset spring 368 which is compressible in the direction of the valve axis AV. The piston reset spring 368 on one side is supported on the port portion 376, and on the other side is supported on a valve piston 364. The valve piston 364 has a piston passage 366 which is continuous along the valve axis AV through the valve piston 364. The valve piston 364 is able to move axially, that is to say in the direction of the valve axis AV, within a magnetic coil unit 382. The valve piston 364 is presently situated in a charge position 364.1 in which the changeover valve 160 in the charge position 160.1 thereof (not shown here) is also situated. The valve piston 364 in this charge position 364.1 is pushed away from the port portion 376 by the piston reset spring 368 and a piston web 386 of the valve piston 364 is pressed against a tight detent 374; the magnetic coil unit 382 herein is in particular not energized. On account of the sealing contact between the valve piston 364 and the tight detent 374, a fluidic connection is established between the valve supply line 370, the piston passage 364, a high-pressure accumulator connector X2, and the high-pressure accumulator 140. In this way, the first medium M1 in the charge position 364.1 of the valve piston 364 can flow from the first medium source MQ1 into the high-pressure accumulator 140, and the high-pressure accumulator 140 can thus be filled.

The valve piston 364 can be moved axially in the direction of the port portion 376 by activating, in particular energizing, the magnetic coil unit 382, in particular by way of a control module 350 not illustrated here. The piston reset spring 368 is compressed herein and the valve piston 364 is lifted from the tight detent 374. The valve piston 364 is thus situated in a release position 364.2 (not illustrated here), such that the first medium M1, which in the high-pressure accumulator 140 is loaded with a high pressure PH, is directed in a pulse-like manner by way of a nozzle connector X1 and a nozzle supply line 372 to the impulse nozzle 126, from where the first medium M1 is directed in a pulse-like manner onto the surface O of a sensor 300 for the purpose of bombarding the latter. Accordingly, when the valve piston 364 is situated in the release position 364.2 thereof, the changeover valve 160 is also situated in the release position 160.2 thereof (not shown here).

A compact construction of the cleaning device 100 is advantageously enabled on account of integrating the high-pressure accumulator 140 and the changeover valve 160 in a valve accumulator module 260. The valve accumulator module 260 can furthermore comprise the supply line check valve 164 and/or the impulse nozzle 126. The valve accumulator module 260 can comprise a plastics material housing or metal housing, for example, in which components are accommodated. On account of the construction illustrated, the valve accumulator module 260 advantageously has only the supply connector X3 and no further inputs, in particular no further inputs on other external sides of the valve accumulator module 260, on account of which the assembling can be simplified. It is of course to be understood that the solenoid valves mentioned here, for example the solenoid valves 360, besides the compressed air are also supplied with electric power when activated.

On account of the first medium M1, which is in particular loaded with a high-pressure PH, according to the concept of the invention being directly switched by the changeover valve 160 and the dependency on other types of valves, in particular pilot valves, thus being reduced, the valve accumulator module 260 and thus also the cleaning device 100 can advantageously be even more compact.

Figure 4:
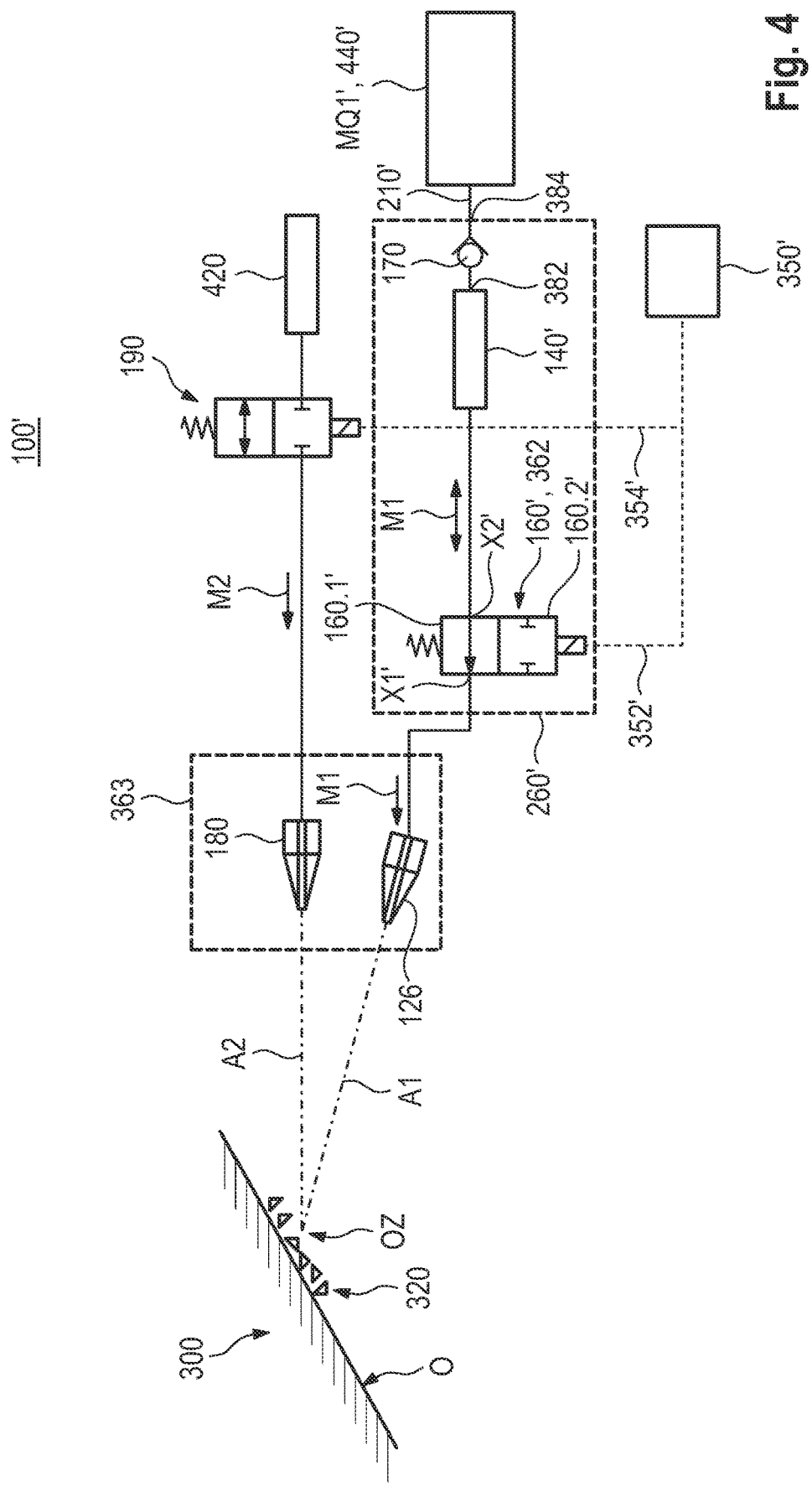
FIG. 4 shows the schematic view of a further embodiment of a cleaning device.

FIG. 4 shows a further embodiment of a cleaning device 100' in which a changeover valve 160' as a solenoid valve 360 in the form of a 2/2-way valve 362 is used. The changeover valve 160' does not have any supply connector X3 but only a nozzle connector X1' and a high-pressure accumulator connector X2'. As opposed in particular to the refinement shown above, a high-pressure accumulator 140' has a high-pressure accumulator direct connector 382 which by way of a high-pressure accumulator holding valve 170 connects the high-pressure accumulator 140' to a first medium supply line 210', and in this way to a first medium source MQ1' in the form of a compressed-air accumulator 440'. The high-pressure accumulator 140' is thus filled with the first medium M1 directly from the first medium source MQ1', wherein the high-pressure accumulator holding valve 170 enables a capacitor effect of the high-pressure accumulator 140. This means that the first medium M1 can flow from the first medium source MQ1' into the high-pressure accumulator 140', but a flow in the opposite direction is however blocked by the high-pressure accumulator holding valve 170.

The changeover valve 160', the high-pressure accumulator 140', and the high-pressure accumulator holding valve 170 in terms of construction here form in particular a unit in the form of a valve accumulator module 260'.

Figure 5:
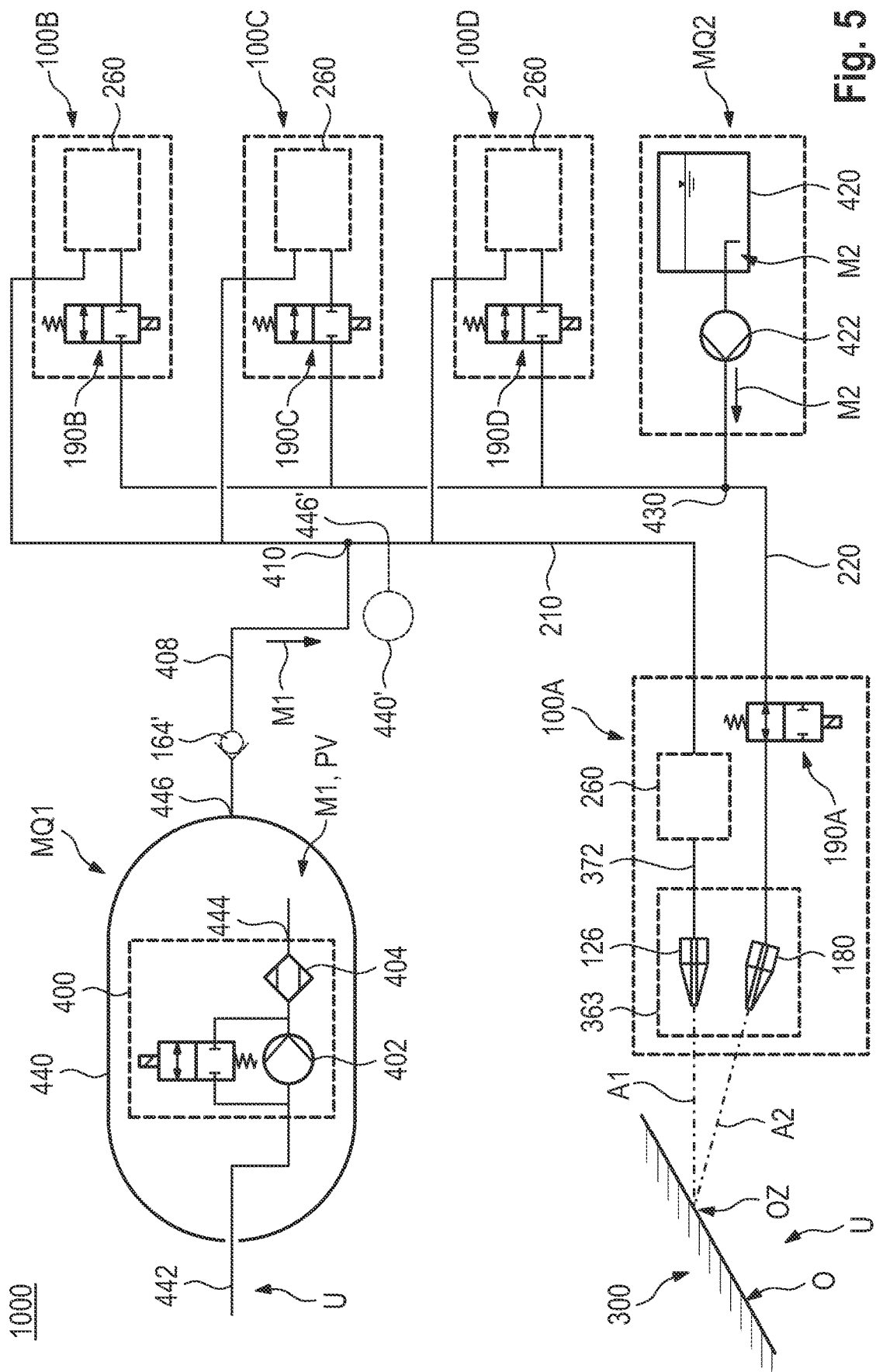
FIG. 5 shows a refinement of a compressed-air system according to an embodiment of the invention.

FIG. 5 shows a refinement of a compressed-air system 1000 according to the concept of the invention. The compressed-air system 1000 has four cleaning devices 100A, 100B, 100C and 100D which each correspond substantially to the cleaning device 100 shown in FIG. 1. Here only one cleaning device 100A is shown in detail, and the remaining three cleaning devices 100B, 100C and 100D are merely indicated for the sake of clarity.

The compressed-air system 1000 has a first medium source MQ1 for providing a first medium M1. The first medium source MQ1 in the present case is formed by a compressor assembly 400, wherein the compressor assembly 400 has a compressor 402, an air dryer 404 and a compressed-air accumulator 440. Provision of a compressed-air accumulator 440 advantageously allows faster supply of the compressed-air system 1000, and the generation of compressed air is temporally decoupled from the consumption of compressed air. In the present case, in the context of a refinement, the compressor assembly 400 is arranged inside the compressed-air accumulator 440, which in particular leads to an advantageous compact structure. The first medium M1, in particular air M1.1, is drawn in from the environment U by the compressor 402 by way of a compressor supply line 442 and compressed, then dried in the air dryer 404 and conducted by way of a compressor outlet 444 into the compressed air accumulator 440. From the compressed air accumulator 440, the first medium M1 is supplied by way of an accumulator outlet 446 and on by way of a first source line 408 to a first supply connector 410.

By means of the compressor assembly 400 in conjunction with the compressed-air accumulator 440 as a first medium source MQ1, in particular as an arrangement with the compressor assembly 400 inside the compressed-air accumulator 440, the cleaning devices 100A, 100B, 100C and 100D can be loaded with compressed air relatively quickly, and also a constant pressure can be ensured in the pressure lines connected to the first medium source MQ1, in particular without the compressor assembly 400 needing to be active.

From the first supply connector 410 the first medium M1 reaches a first medium supply line 210, from where said first medium M1 is provided at a supply connector X3 of a changeover valve 160, not illustrated in more detail here, of a valve accumulator assembly 260 of the cleaning device 100A, and in an analogous manner at the remaining three cleaning devices 100B, 100C and 100D.

Alternatively or additionally to the supply line check valves 164 or the high-pressure accumulator holding valves 174 (neither illustrated here) that are disposed in the valve accumulator assemblies 260 of the respective cleaning devices 100A, 100B, 100C, and 100D, the compressed-air system 1000 may comprise a further supply line check valve 164', in particular—as indicated in dashed lines in FIG. 5—in the first source line 408. This advantageously achieves that the first medium generated and in particular compressed by the first medium source MQ1 does not, on a pressure fall, flow back into the first medium source MQ1, in particular the compressed-air accumulator 440, which would lead to a pressure fall in the first medium supply line 210. Instead, the further supply line check valve 164', which blocks against the conveying direction of the first medium source, causes the first medium not to flow back in the direction of the first medium source MQ1, and hence in particular a supply pressure PV is maintained in the first medium supply line 210.

Alternatively or additionally to the compressed-air accumulator 440, the compressed-air system 1000 may comprise a further compressed-air accumulator 440', in particular—as shown in dotted lines in FIG. 5—in the first medium supply line 210. Said further accumulator in the present case is connected to the medium supply line 210 by way of an accumulator outlet 446'. It is also possible to arrange the accumulator outlet 446' at another suitable site of the compressed-air system 1000, for example in the first source line 408.

Alternatively or additionally, in a refinement not shown here, a first medium M1, in particular compressed air, may also be used which is taken from another medium source MQ1', in particular a medium source MQ1' which serves another primary purpose. Such another medium source MQ1' may for example be a compressed-air supply system 900 for an air suspension system 901 or similar pneumatic system 910 of a vehicle 800.

The compressed-air system 1000 furthermore has a second medium source MQ2 for providing an in particular liquid second medium M2. In the present case, the second medium source MQ2 is formed by a tank 420 and a pump 422 connected to the tank. By means of the pump, the second medium M2 may be conveyed from the tank 420 to a second supply connector 430. By way of the second supply connector 430, the second medium M2 reaches the second medium supply line 220. The second medium supply line 220 is connected to the second changeover valve 190A of the cleaning device 100A, and furthermore to the second changeover valves 190B, 190C, 190D of the respective further cleaning devices 100B, 100C, 100D. By way of the second changeover valves 190A, 190B, 190C, 190D, the supply of the second medium M2 to the respective cleaning devices 100A, 100B, 100C, 100D can thus be controlled individually.

Alternatively or additionally, in a refinement not shown here, a second medium M2 may also be used which is taken from another medium source MQ2', in particular a medium source MQ2' which serves another primary purpose. Such another medium source MQ2' may for example be a screen washing system 922 or similar cleaning system 920 for a vehicle 800.

Figure 6:
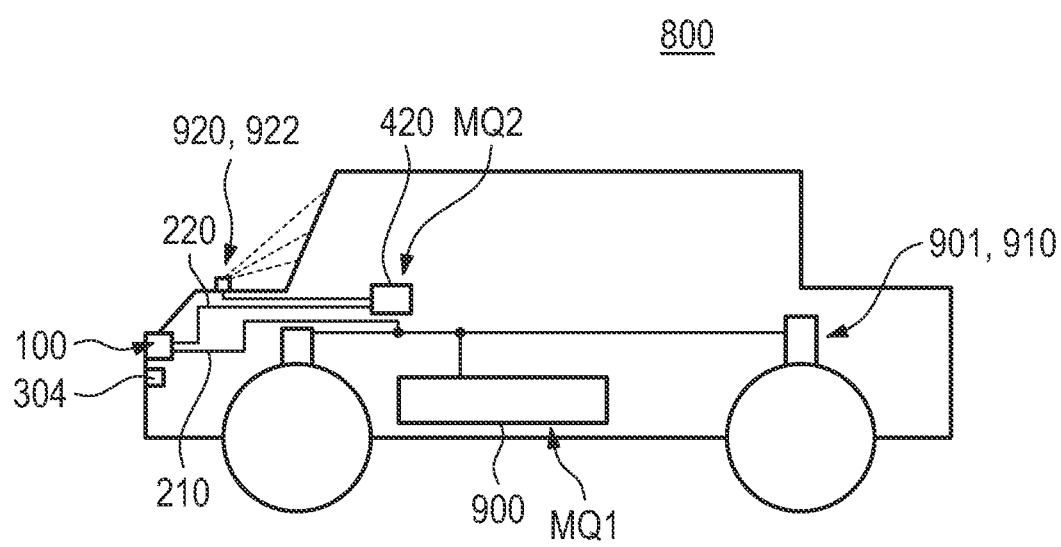
FIG. 6 shows a schematic illustration of a vehicle having a cleaning device according to an embodiment of the invention.

FIG. 6 shows a diagrammatic depiction of a vehicle 800, in the present case in the form of a car, comprising a cleaning device 100 for an environment detection sensor 304. In the present case, the first medium source MQ1 is formed by a compressed-air supply system 900 which is furthermore provided for supplying a pneumatic system 910 in the form of an air suspension system 901. Evidently, it is also possible for the first medium source MQ1 to be formed by a separate compressor or similar compressed-air source. The first medium source MQ1 is connected to the cleaning device 100 for the purpose of supplying the first medium M1 via a first medium supply line 210. The second medium source MQ2 in the present case is formed by a tank 420, which is also used to supply cleaning fluid to a cleaning system 920 in the form of a screen cleaning system 922. This tank 420 is connected to the cleaning device 100 via a second medium supply line 220. In this way, the second medium M2 can be supplied to the cleaning device 100 via a pump 422 (not shown here for reasons of clarity). Evidently, the second medium source MQ2 may also be formed by a specific, separate medium source, in particular independent of other systems.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 100, 100', 100A, Cleaning device
100B, 100C, 100D
125 Impulse nozzle supply line
126 Impulse nozzle
140, 140' High-pressure accumulator
140V Holding capacity
160, 160' Changeover valve
160.1 Charge position
160.2 Release position
160.2' Charge position/holding charge—pressure build-up
160.1' Release position—impulse release
164, 164' Supply line check valve
170 High-pressure accumulator holding valve
180, 180K Nozzle
190, 190A, 190B, Second changeover valve
190C, 190D
192 Supply line
210, 210' First medium supply line
220 Second medium supply line
260, 260' Valve accumulator module
300 Sensor
302 Optical sensor
304 Environment detection sensor
310 Sensor cover
320 Dirt particle
350, 350' Control module
352, 352' First changeover valve control line
354, 354' Second changeover valve control line
360 Solenoid valve
361 3/2-way valve
362 2/2-way valve
363 Nozzle assembly
364 Valve piston
366 Valve piston passage
368 Piston reset spring
370 Valve supply line
372 Nozzle supply line
374 Tight detent
376 Port portion
378 Port opening
380 Spring chamber
382 High-pressure accumulator direct connector
384 Feed connector
386 Piston web
400 Compressor assembly
402 Compressor
404 Air dryer
408 First source line
410 First supply connector
420 Tank
422 Pump
430 Second supply connector
440, 440' Compressed-air accumulator, central pressure accumulator
442 Compressor supply
444 Compressor outlet
446, 446' Accumulator outlet
800 Vehicle
900 Compressed-air supply system
901 Air suspension system
910 Pneumatic system
920 Cleaning system
922 Screen washing system
1000 Compressed-air system
A1 First jet axis
A2 Second jet axis
AV Valve axis
M1 First medium
M1.1 Air
M2 Second medium
M2.1 Water
M2.2 Cleaning agent
MS Media sequence
MQ1, MQ1' First medium source
MQ2 Second medium source
Surface
OZ Target region
PH High pressure, operating pressure
PS Accumulator pressure
PV Supply pressure
PU Ambient pressure
X1, X1' Nozzle connector
X2, X2' High-pressure accumulator connector
X3 Supply connector

The invention claimed is:

1. A cleaning device for selectively bombarding a surface with a first medium, the cleaning device comprising:
an accumulator valve module, comprising:
a high-pressure accumulator configured to store the first medium at a high-pressure accumulator pressure,
an impulse nozzle configured to bombard the surface with the first medium, and
a changeover valve configured as a solenoid valve having a nozzle connector configured to connect to the impulse nozzle, a high-pressure accumulator connector configured to connect to the high-pressure accumulator, and a feed connector configured to connect to a first medium source, wherein the changeover valve is configured to:
connect, in a release position, the high-pressure accumulator and the impulse nozzle via the high-pressure accumulator connector and the nozzle connector; and connect, in a charge position, the high-pressure accumulator and the first medium source via the high-pressure accumulator connector and the feed connector; and switch between the release position and the charge position.

2. The cleaning device as claimed in claim 1, wherein:
the changeover valve is configured to form, in the release position, a first connection between the high-pressure accumulator and the impulse nozzle, the first connection including the high-pressure accumulator connector, the nozzle connector, and a nozzle supply line; and
the changeover valve is configured to form, in the charge position, a second connection between the first medium source and the high-pressure accumulator, the second connection including a first medium supply line, the feed connector, and the high-pressure accumulator connector.

3. The cleaning device as claimed in claim 1, further comprising a second nozzle configured to bombard the surface with a second medium;
wherein the cleaning device is configured to bombard the surface with a media sequence of the first medium and the second medium,
wherein the first medium is a gaseous medium and the second medium is a liquid medium.

4. The cleaning device as claimed in claim 1, wherein the solenoid valve is a 3/2-way valve.

5. The cleaning device as claimed in claim 1, wherein the solenoid valve includes a magnetic coil unit configured to switch the solenoid valve from the charge position to the release position.

6. The cleaning device as claimed in claim 1, wherein the accumulator valve module further comprises a supply line check valve, the supply line check valve being configured to block a flow of the first medium in a direction from the changeover valve to a first medium supply line.

7. The cleaning device as claimed in claim 1, wherein the high-pressure accumulator has a holding capacity between 2 ml and 10 ml.

8. A compressed-air system, comprising:
at least one cleaning device as claimed in claim 1,
wherein the first medium source is a medium source of the compressed-air system and, wherein the first medium source is, by way of a first medium supply line, configured to be connected to the at least one cleaning device.

9. The compressed-air system as claimed in claim 8, further comprising:
a second medium source, wherein the second medium source is, by way of a second medium supply line, configured to be connected to the at least one cleaning device.

10. The compressed-air system as claimed in claim 8, wherein the compressed-air system has a supply line check valve,
wherein the supply line check valve is disposed in the first medium supply line,
wherein the supply line check valve is configured to block a flow of the first medium in a direction opposite a conveying direction of the first medium source and/or is configured to maintain a supply pressure in a line connected to the high-pressure accumulator.

11. A vehicle having a compressed-air system as claimed in claim 8.

12. The vehicle as claimed in claim 11, wherein, in the compressed-air system, the first medium source is configured to supply an air suspension system of the vehicle.

13. The vehicle as claimed in claim 11, wherein, in the compressed-air system, the second medium source is configured to supply a cleaning system of the vehicle.

14. The vehicle as claimed in claim 11, wherein, in the compressed-air system, the first medium source has a compressor assembly and/or a compressed air accumulator.

15. A cleaning method for cleaning a surface by selectively bombarding a surface with a media sequence of at least a first gaseous medium and a second liquid medium, the method comprising:
providing an accumulator valve module, comprising:
a high-pressure accumulator configured to store the first medium at a high-pressure accumulator pressure,
an impulse nozzle configured to bombard the surface with the first medium, and
a changeover valve configured as a solenoid valve having a nozzle connector configured to connect to the impulse nozzle, a high-pressure accumulator connector configured to connect to the high-pressure accumulator, and a feed connector configured to connect to a first medium source;
holding the high-pressure accumulator pressure in the high-pressure accumulator by switching the changeover valve to a charge position in which the high pressure accumulator and the first medium source are connected via the high-pressure accumulator connector and the feed connector;
bombarding, via a second nozzle, the surface with the second medium; and
bombarding, via the impulse nozzle, the surface with the first medium by switching the changeover valve to a release position in which the high-pressure accumulator and the impulse nozzle are connected via the high-pressure accumulator connector and the nozzle connector.

16. The cleaning method as claimed in claim 15, wherein the bombarding the surface with the second medium and the bombarding the surface with the first medium are performed in an alternating and/or intermittent manner.

17. The cleaning device as claimed in claim 1, the accumulator valve module further comprising a housing, wherein the high-pressure accumulator and the changeover valve are disposed in the housing.

18. The method as claimed in claim 15, wherein the accumulator valve module further comprises a housing, wherein the high-pressure accumulator and the changeover valve are disposed in the housing.

* * * * *